(12) United States Patent
Mitamura

(10) Patent No.: US 6,719,549 B1
(45) Date of Patent: *Apr. 13, 2004

(54) TIRE VULCANIZING EQUIPMENT

(75) Inventor: Hisashi Mitamura, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 266 days.

This patent is subject to a terminal disclaimer.

(21) Appl. No.: 09/684,673

(22) Filed: Oct. 11, 2000

(30) Foreign Application Priority Data

Oct. 12, 1999 (JP) .......................................... 11-289185

(51) Int. Cl.⁷ .............................................. B29C 35/02
(52) U.S. Cl. ...................................... 425/34.1; 425/38
(58) Field of Search .................................. 425/34.1, 38

(56) References Cited

U.S. PATENT DOCUMENTS

| | | | |
|---|---|---|---|
| 5,820,885 A | 10/1998 | Irie | ........................... 425/34.1 |
| 6,196,819 B1 * | 3/2001 | Mitamura | ................... 425/34.1 |

FOREIGN PATENT DOCUMENTS

| | | | |
|---|---|---|---|
| DE | 1 167 011 | | 4/1964 |
| JP | 8-164528 | | 6/1996 |
| JP | 11-245231 | * | 9/1999 |
| KR | 1995-0008073 | | 4/1995 |

* cited by examiner

*Primary Examiner*—James P. Mackey
(74) *Attorney, Agent, or Firm*—Oblon, Spivak, McClelland, Maier & Neustadt, P.C.

(57) ABSTRACT

This vulcanizing equipment comprises a vulcanizing station, an opening and closing station and a transfer station. The vulcanizing station has a housing shelf vertically having plural stages of placing parts for placing tire mold assemblies movable in closed state, which have pipings for supplying and discharging a vulcanizing/heating medium to the tire mold assemblies placed thereon. The opening and closing station has a placing part for placing the tire mold assembly, an opening and closing device for opening and closing the tire mold assembly placed on this placing part, a carrying-out device for carrying vulcanized tires from the tire mold assembly, and a carrying-in device for carrying unvulcanized tires to the tire mold assembly. The transfer station performs the transfer of the tire mold assembly between an optional stage of the placing parts of the housing shelf and the placing part of the opening and closing station by the rising and falling action along the housing shelf of the vulcanizing station.

18 Claims, 8 Drawing Sheets

F I G. 6
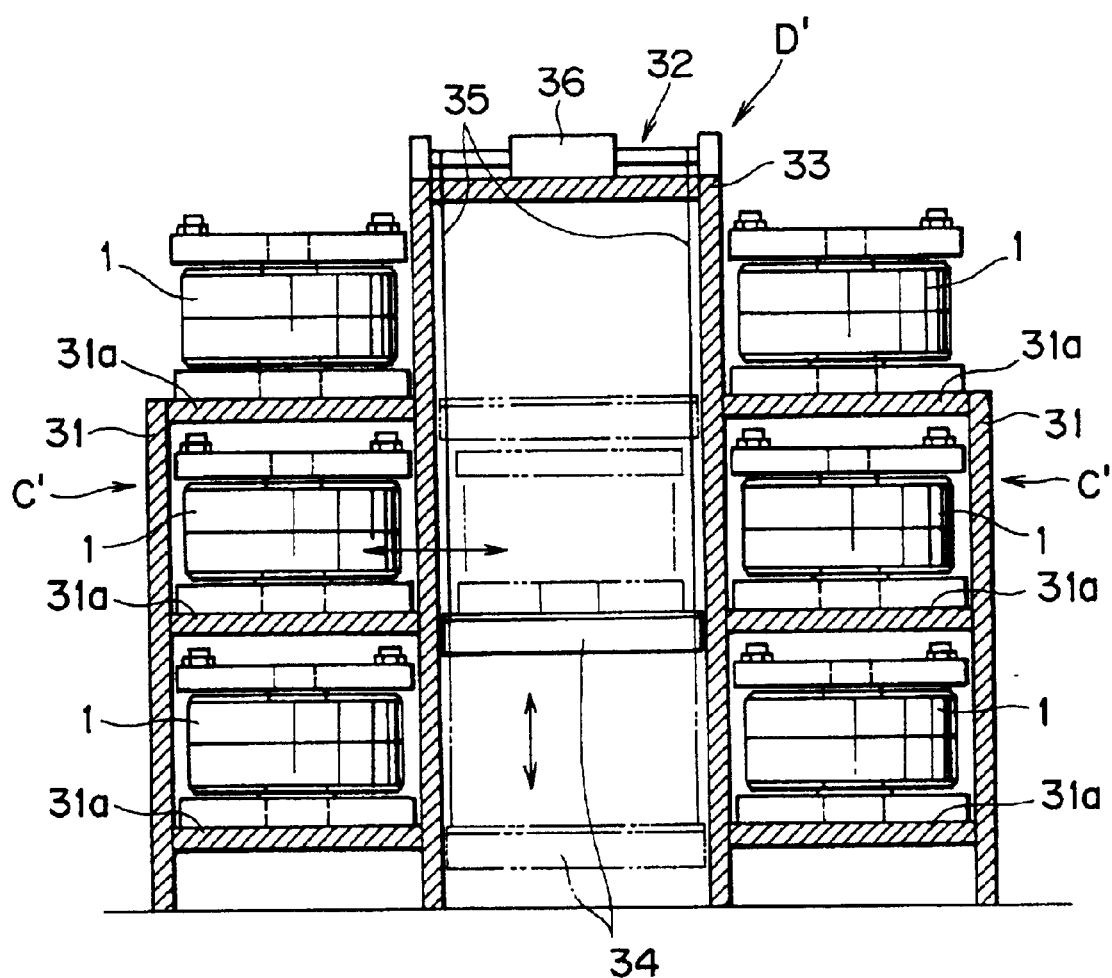

TIRE VULCANIZING EQUIPMENT

BACKGROUND OF THE INVENTION

1. Field of the Invention

This invention relates to a tire vulcanizing equipment for performing a series of treating operations from the carrying-in of an unvulcanized tire for vulcanization to its carrying-out as a vulcanized tire.

2. Description of the Related Art

In a conventional tire vulcanizing press, the working time of opening and closing a tire mold assembly to perform carrying-in of an unvulcanized tire, shaping, and unloading a vulcanized tire is extremely short, compared with the vulcanization time. Therefore, equipments in which the number of tire vulcanizing devices to one tire mold opening and closing device for opening and closing the tire mold assembly or tire carrying-in and carrying-out device is increased to improve the availability factors of these devices have been variously proposed and executed.

A tire vulcanizing equipment of a first constitution, for example, comprises a vulcanizing station 100 formed by circumferentially arranging a plurality of mold bases 101 for placing tire mold assemblies M as shown in FIG. 7. The mold bases 101 are provided with an internal pressure supplying device (heating and pressurizing medium supplying device to tire internal part) 102 or an external pressure supplying device (heating medium supplying device to tire circumferential part) 103, and storage bases for vulcanized tires and unvulcanized tires are arranged on the second floor situated above the vulcanizing station 100.

One opening and closing station 120 is arranged in the central position of the vulcanizing station 100. The opening and closing station 120 comprises a delivering mechanism and opening/closing mechanism of the tire mold assembly M, a carrying-out mechanism of vulcanized tires and carrying-in mechanism of unvulcanized tires between the tire mold assembly M and the storage bases, and a rotating mechanism for rotating the opening and closing station itself in an optional assembly direction together with these mechanisms.

According to this first constitution, the opening and closing station 120 itself is rotated in the direction of an intended tire mold assembly M, whereby not only the unloading and opening/closing of a plurality of tire mold assemblies M but also the carrying-out of vulcanized tires from the tire mold assembly and carrying-in of unvulcanized tires thereto can be performed by use of the single opening and closing station 102.

A tire vulcanizing equipment of a second constitution comprises, as shown in FIGS. 8 and 9, a vulcanizing station 131 having a housing shelf 130 having placing parts 130a for placing the tire mold assemblies M arranged in horizontal and vertical matrix form to the floor surface. On the side of the vulcanizing station 131, a tire support device 135 for placing vulcanized tires and unvulcanized tires, a carrying line 134 for supplying unvulcanized tires, and a tire carrying-out device 136 for carrying vulcanized tires to the following step are arranged along the vulcanizing station 131.

One opening and closing station 132 is provided between the vulcanizing station 131 and the tire support device 135 so as to move in parallel to the vulcanizing station 131. The opening and closing station 132 comprises a delivering mechanism and opening/closing mechanism of the tire mold assembly M, a carrying-out mechanism of vulcanized tires and carrying-in mechanism of unvulcanized tire to the tire mold assembly M, a lifting mechanism for positioning the delivering mechanism in an optional height position, and a forward and backward moving mechanism for moving forward and backward the opening and closing station 132 itself along the vulcanizing station 131 together with these mechanisms.

According to the second constitution, the opening and closing station 132 itself is moved forward and backward in the direction of an intended tire mold assembly M, and the delivering mechanism is then raised and lowered, whereby the unloading of a plurality of tire mold assemblies M can be performed by use of one opening and closing station 132 similarly to the first constitution described above.

However, in the above conventional first and second constitutions, the rotation and forward/backward movement of the opening and closing stations 120, 132 including the opening mechanisms and carrying mechanisms themselves cause the following problems.

(1) Since such a movement requires the detachment and attachment of the piping and wiring connected to each mechanism of the opening and closing stations 120, 132 or the distribution thereof so as not to slide off, the opening and closing stations 120, 132 are complicated by these piping and wiring members, leading to a cost increase.

(2) The opening and closing stations 120, 132 are rather heavy since each mechanism is included therein. Therefore, the rotating mechanism or forward/backward moving mechanism used for the rotation or forward/backward movement is required to have a structure capable of generating sufficiently high strength and driving force, which results in the enlargement of these moving mechanisms and a cost increase.

(3) Since the opening and closing stations 120, 132 are not only heavy but also tall, the moving speed must be limited in order to avoid the danger of falling, vibration or the like in the forward/backward movement or rotation. Therefore, the idle time up to the movement of the opening and closing stations 120, 132 to the intended tire mold assembly and the carrying time from the loading of the tire mold assembly to the carrying to the stations are extended to extend the cycle time of production.

(4) In the first constitution, it is necessary to circularly arrange the storage bases used for supplying unvulcanized tires and carrying vulcanized tires in the same manner as the vulcanizing station 100 as shown in FIG. 7, and this leads to the enlargement and complication of the tire vulcanizing equipment including a control device for tire and a physical distribution apparatus. Although it may be considered to set the storage bases in one place to solve the problem of the enlargement and complication, the extra rotating operation of the opening and closing station 120 is required since pickup of unvulcanized tire and carrying-out of vulcanized tire must be performed in this position every time, which leads to the more remarkable extension of the cycle time.

The second constitution also has the same problems. Namely, in the second constitution, the tire support device 135, the carrying line 134 and the tire carrying-out device 136 are provided along the vulcanizing station 131 so that unvulcanized tires can be supplied to the moving position of the opening and closing station 132, and vulcanized tires can be carried out from this moving position. Such an arrangement of the line 134 and the devices 135, 136 makes the tire vulcanizing equipment larger and more complicate.

(5) In the first constitution, as shown in FIG. 7, the tire mold assembly has no means of escape from the vulcanizing station 100 to stop all the movements when the one opening and closing station 120 set in the center breaks down. In such a case, many tires left in the vulcanizing station 100 cannot be taken out from the molds even if the vulcanization time expires, resulting in defective products by over-curing.

(6) In the second constitution, as shown in FIGS. 8 and 9, the forward/backward movement of the tall opening and closing station 132 requires a vertically large moving space at least in the forward/backward moving area, so that the building internal space can not be effectively utilized.

SUMMARY OF THE INVENTION

This invention thus has an object to provide a tire vulcanizing equipment capable of realizing a shorter cycle time of production, a smaller size of the tire vulcanizing equipment, and a lower cost.

The tire vulcanizing device of this invention comprises a vulcanizing station having placing parts for placing tire mold assemblies movable in close state and a housing shelf vertically having plural stages of the placing parts; an opening and closing station having a placing part for placing the tire mold assembly, an opening and closing device for opening and closing the tire mold assembly placed on this placing part, a carrying-out device for carrying vulcanized tires from the tire mold assembly, and a carrying-in device for carrying unvulcanized tires to the tire mold assembly; and a transfer station for transferring the tire mold assembly between an optional stage of placing parts of the housing shelf and the placing part of the opening and closing station by the rising and falling action along the housing shelf of the vulcanizing station. Otherwise, the tire vulcanizing equipment of this invention comprises a vulcanizing station having a housing shelf vertically having plural stages of placing parts for placing tire mold assemblies movable in closed state, which have pipings for supplying and discharging a vulcanizing/heating medium to the tire mold assemblies placed thereon; an opening and closing station having a placing part for placing the tire mold assembly, an opening and closing device for opening and closing the tire mold assembly placed on this placing part, a carrying-out device for carrying vulcanized tires from the tire mold assembly, and a carrying-in device for carrying unvulcanized tires to the tire mold assembly, the opening and closing station being connected to a carrying-out line of vulcanized tires to the following step and a carrying-in line of unvulcanized tires; and a transfer station for transferring the tire mold assembly between an optional stage of the placing parts of the housing shelf and the placing part of the opening and closing station by the rising and falling action along the housing shelf of the vulcanizing station.

According to the above constitutions, the weight of the transfer station can be significantly reduced, compared with a conventional opening and closing station having all functions such as transfer function of tire molds, and the transfer station can be constituted with a mechanism with small strength and driving force generation conformable to the reduction in weight, resulting in a smaller size of the transfer station and a lower cost. Further, since the transfer is performed by the rising and falling action of the transfer station, the danger of falling or vibration can be significantly reduced, compared with the transfer by the forward/backward movement of a heavy matter as in the past. Accordingly, the speed of the rising and falling action can increased, so that the idle time up to the movement of the transfer station to the intended tire mold assembly and the carrying time from the loading of the tier mold assembly to the carrying to the other place can be shortened, and a shorter cycle time of production can be consequently realized.

Since the transfer of the tire mold assembly between the opening and closing station and the vulcanizing station is performed by the rising and falling action of the transfer station, the opening and closing station and the vulcanizing station can be fixed. The opening and closing station can be thus simplified since the conventional distribution with a precondition of movement of the wiring and piping connected to each mechanism of the opening and closing station is not required. In the transfer station, the number of wirings and pipings can be suppressed to a one conformable to the minimum mechanism necessary for the transfer of tire mold assemblies, and the complication accompanying the distribution of the wirings and pipings can be thus minimized. Thus, the complication by the distribution of wirings can be sufficiently reduced as the whole tire vulcanizing equipment.

Since the opening and closing station is fixable, no moving space for the opening and closing station is required, resulting in the effective utilization of the building internal part. Since carrying-out of vulcanized tires and carrying-in of unvulcanized tires are preformed in one place, the physical distribution apparatuses of the carrying-out line and carrying-in line can be simplified, and the carrying-in and carrying-out operations to both the lines can be smoothened.

The above tire vulcanizing equipment may further comprise an auxiliary station having a placing part for placing the tire mold assembly and an opening and closing device for opening and closing the tire mold assembly placed on this placing part.

According to the above constitution, even if the opening and closing station is stopped by any trouble, the taking-out of the vulcanized tire can be performed in the auxiliary station without stopping the flow of the whole equipment, so that the product can be prevented from being defective or junk by over-curing.

Further, the auxiliary station may have a carrying-out device for carrying vulcanized tires from the tire mold assembly and a carrying-in device for carrying unvulcanized tires to the tire mold assembly, or be connected to the carrying-out line of vulcanized tire to the following step and to the carrying-in line of unvulcanized tires, or the auxiliary station may be further provided with a mold replacement/maintenance base.

Since the auxiliary station can be used in the same manner as the opening and closing station according to the above constitution, the carrying-in and carrying-out operations to the carrying-out line and carrying-in line can be more smoothened, and replacement of metal molds can be also performed.

In the above tire vulcanizing equipment, the transfer station may have a rising and falling transfer device having a first delivering mechanism capable of delivering the tire mold assembly and switching the guide direction of the tire mold assembly to the direction of an optional placing part, a placing part for placing the tire mold assembly received by the first delivering mechanism, and a lifting mechanism for raising and lowering the first delivering mechanism and the placing part along the housing shelf.

Since the transfer station can be realized with a simple structure according to the above constitution, the number of parts and the assembling cost can be reduced, and high reliability with few failures can be provided.

Further, the transfer station may have a rotating transfer device having a second delivering mechanism for delivering the tire mold assembly, a placing part for placing the tire mold assembly received by the second delivering mechanism, and a turntable rotatable so as to set the guide direction of the tire mold assembly by the second delivering mechanism to the direction of an optional placing part. Otherwise, the tire vulcanizing equipment may have a plurality of transfer stations, so that the transfer of the tire mold assembly is performed between the respective transfer stations.

Since the transfer station can be realized with a simple structure according to the above constitution, the number of parts and the assembling cost can be reduced, and high reliability with few failures can be provided. Further, the combination of the rising and falling transfer device with the rotating transfer device allows the extension of the freedom in design of the equipment layout.

The tire vulcanizing equipment may comprise a vulcanizing station consisting of a plurality of circularly arranged mold bases for placing tire mold assemblies movable in closed state, which having pipings for supplying and discharging a vulcanizing/heating medium to the tire mold assemblies placed thereon; an opening and closing station having a mold base arranged on the same circumference as the mold bases of the vulcanizing station, an opening and closing device for opening and closing the tire mold assembly placed on the mold base, a carrying-out device for carrying vulcanized tires from the tire mold assembly, and a carrying-in device for carrying unvulcanized tires to the tire mold assembly, the opening and closing station being connected to the carrying-out line of vulcanized tires to following step and the carrying-in line of unvulcanized tires; and a transfer station arranged in the center of the same circumference to perform the transfer of the tire mold assembly between the mold base of the vulcanizing station and the mold base of the opening and closing station on the same circle by the rotating action. Otherwise, the tire vulcanizing equipment may comprise a vulcanizing station having a plurality of circularly arranged placing parts and a transfer station arranged in the center of the same circumference, so that the transfer of the tire mold assembly is performed between the circularly arranged placing part and the placing part of the opening and closing station.

According to the above constitution, the weight of the transfer station can be significantly reduced, compared with a conventional opening and closing station having all functions such as transfer function of tire mold assemblies, and the height can be also reduced to lower the center of gravity, so that the transfer station can be constituted with a mechanism with small strength and driving force generation conformable to the reduction in weight. Therefore, the transfer station can be consequently miniaturized and reduced in cost. Further, since the danger of falling or vibration in rotating movement is reduced when the center of gravity of the transfer station is lowered, the moving speed can be increased to shorten the idle time up to the movement of the transfer station to the intended tire mold assembly and also the carrying time from the loading of the tire mold assembly to the carrying to the other place, and a shorter cycle time of production can be consequently realized.

Since the transfer of the tire mold assembly between the opening and closing station and the vulcanizing station is preformed by the rotating action of the transfer station, the opening and closing station and the vulcanizing station can be fixed on the same circle. Accordingly, since the conventional distribution with a precondition of movement of the wiring and piping connected to each mechanism of the opening and closing station is not required, the structure of the opening and closing station can be simplified. In the transfer station, the complication accompanying the distribution of the wirings can be minimized since the number of wirings and pippins can be suppressed to a one according to the minimum mechanism necessary for the transfer of tire mold assemblies. Consequently, the complication by the distribution of wirings can be sufficiently reduced as the whole tire vulcanizing equipment.

Further, since carrying-out of vulcanized tires and carrying-in of unvulcanized tires are performed in the opening and closing station, the physical distribution apparatuses of the carrying-out line and the carrying-in line can be simplified, and the connection to both the lines can be also smoothened.

The above tire vulcanizing equipment may have, on the same circle, an auxiliary station having a placing part for placing tire mold assemblies and an opening and closing device for opening and closing the tire mold assembly placed on this placing part, wherein the transfer station performs the transfer of the tire mold assembly also between the placing part of the auxiliary station and the placing part of the vulcanizing station.

According to the above constitution, even if the opening and closing station is stopped by any trouble, the taking-out of vulcanized tire can be preformed in the auxiliary station without stopping the flow of the whole equipment, so that the product can be prevented from being defective or junk waste by over-curing.

In the above tire vulcanizing equipment, two or more station groups corresponding to the above circular arrangement may be juxtaposed, and mutually connected through guide rails allowing the movement of the tire mold assembly between the both.

According to the above constitution, even if the opening and closing station in one circular station group is stopped by any trouble, the taking-out of vulcanized tires can be performed without stopping the flow of the whole equipment since the tire mold assembly can be carried to the other circular station group through the guide rails. Further, each of the opening and closing stations of the circular station groups can be used as the auxiliary station of the other circular station group.

In the above tire vulcanizing equipment, the transfer station may have a delivering mechanism for delivering the tire mold assembly and a turntable rotatable so as to set the guide direction of the tire mold assembly by the delivering mechanism to the direction of an optional circularly arranged placing part.

Since the transfer station can be realized with a simple structure according to the above structure, the number of parts and the assembling cost can be reduced, and high reliability with few failures can be provided. The center of gravity of the transfer station can be also lowered to increase the rotating speed.

BRIEF DESCRIPTION OF THE DRAWINGS

FIG. 6 is a perspective side view taken along the line Y—Y of the tire vulcanizing equipment in FIG. 5;

DESCRIPTION OF THE PREFERRED EMBODIMENTS

Figure 1:
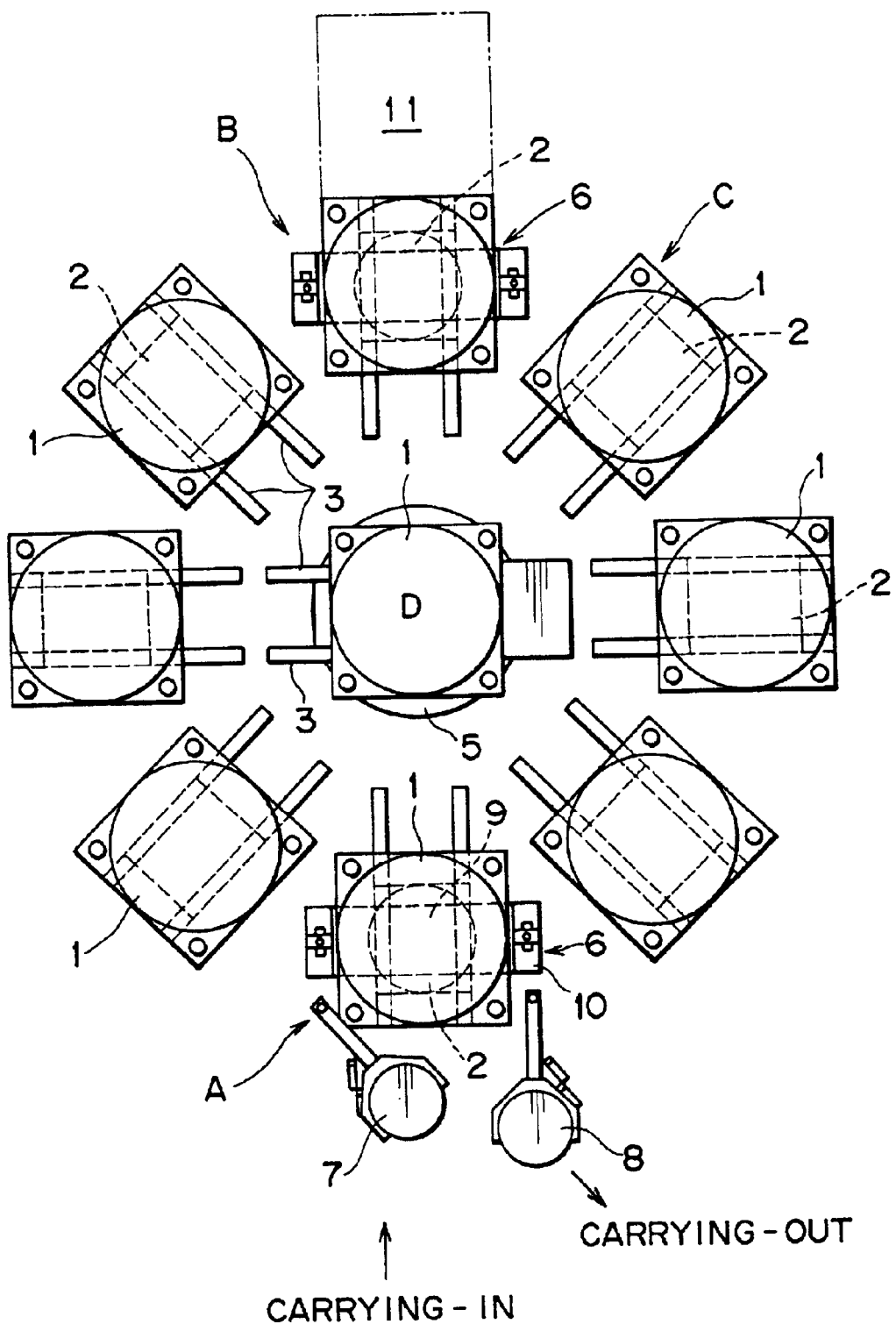
FIG. 1 is a plan arrangement view of a tire vulcanizing equipment according to a first embodiment of this invention.

A first preferred embodiment of this invention is described on the basis of FIG. 1. FIG. 1 is a plan arrangement view of the tire vulcanizing equipment of this invention. In FIG. 1, the tire vulcanizing equipment comprises a vulcanizing station C, a transfer station D, an opening and closing station A and an auxiliary station B. The vulcanizing station C has a plurality of mold bases 2 (placing parts) for placing tire mold assemblies, and each of the opening and closing station A and the auxiliary station has one similar mold base 2 (placing part). Each mold base 2 in the stations C, A, and B is arranged on the same circumference (circularly) around the transfer station D. An unvulcanized tire carried into the opening and closing station A is installed into a tire mold assembly 1 in the opening and closing station A. The tire mold assembly 1 clamped in the opening and closing station A is transferred to an empty mold base 2 of the vulcanizing station C through the transfer station D. When the vulcanization draws to a close after the lapse of a fixed time in the vulcanizing station C, the tire mold assembly 1 is returned to the opening and closing station A through the transfer station D. Since it comes time to end the vulcanization at this point of time, the mold is opened to take out the vulcanized tire, which is then carried to the carrying-out line to the following cooling step.

The vulcanizing station C has a plurality of mold bases 2 arranged radially from the transfer station D. Each mold base 2 has guide rails 3 for guiding the tire mold assembly 1 toward the transfer station D. Free rollers for sliding the tire mold assembly 1 are provided on the upper surfaces of the guide rails 3 to movably support the tire mold assembly 1 in the guide direction.

Each mold base 2 has an internal pressure supplying device (piping) not shown for supplying a heating and pressurizing medium (vulcanizing/heating medium) to the tire inner part in the tire mold assembly 1 and an external pressure supplying device (piping) not shown for supplying a heating medium (vulcanizing/heating medium) to the tire mold circumferential part. The internal pressure supplying device is connected to the tire mold assembly 1 in a prescribed position on the mold base 2, so that the heating and pressurizing medium is supplied to the tire inner part to replace the heated and pressurized medium temporarily sealed to the tire inner part at the time of clamp shaping in the opening and closing station A therewith. Since the tire mold assembly is moved quickly from the opening and closing station A to the vulcanizing station C by the quick rotation of the transfer station D described later, the temporarily sealed heating and pressurizing medium can be replaced in an extremely short time, and this is preferable from the viewpoint of management of tire quality.

The number of the mold bases 2 in the vulcanizing station C is 6 in FIG. 1, but any number of bases, if radially arranged, may be adapted in this invention without being limited by this.

The transfer station D has guide rails 3 for guiding the tire mold assembly 1 similarly to the above-mentioned vulcanizing station C, and it also has a mold transfer arm for pushing and pulling the tire mold assembly 1 to and from the guide rails 3 and a driving device thereof (not shown). The guide rails 3 are provided on a turntable 5. The turntable 5 consists of a circular plate having a rotating shaft on the lower surface thereof as the center, and the rotating shaft is supported by a bearing. Circular rails corresponding to several sets of rollers for supporting the turntable circumferential part are laid on the floor surface, and several sets of rollers are rotated while being guided by these rails to support the turntable circumferential part. As the rotating device of the turntable, a rotating means conventionally used in general such as motor can be adapted, and it is connected to the rotating shaft.

The opening and closing station A has an opening and closing device 6 for opening and closing the tire mold assembly, a loader 7 for carrying an unvulcanized tire from the carrying-in line to the tire mold assembly 1, and an unloader 8 for carrying a vulcanized tire from the tire mold assembly 1 to the carrying-out line.

The opening and closing device 6 has an upper movable plate 9 for suspending the upper die part of the tire mold assembly 1 above the mold base 2 to vertically move it, a frame 10 for supporting and guiding the upper movable plate in such a manner as to be vertically movable, and a lower central mechanism (not shown). The lower central mechanism is located in the center of the mold base 2 to operate a bladder to the center of the lower die part of the tire mold assembly 1 placed on the mold base 2 from the lower side. The frame 10 is stood on the sides of the mold base 2, the upper movable plate 9 has a split die type operating cylinder in the center and a mold connecting device in the circumference, respectively, and the frame 10 has a lifting cylinder (not shown) for raising and lowering the upper movable plate 9.

A series of operations of the opening and closing station A is described below.

(1) The tire mold assembly 1 close to the vulcanization end is transferred from the vulcanizing station C to the transfer station D by the mold transfer arm functioning as a pulling device, rotated, transferred to the opening and closing station A by the mold transfer arm functioning also as a pushing device, and delivered into the opening and closing device 6.

(2) When the tire mold assembly 1 is stopped, the upper movable plate 9 is lowered to connect the mold connecting device and split die operating device of the upper movable plate 9 to the upper die part of the tire mold assembly 1, and after the vulcanization is ended, the upper die part is opened according to the rise of the upper movable plate 9.

(3) The vulcanized tire left on the lower die part is peeled from the lower die part by the lower central mechanism.

(4) The unloader 8 is moved onto the lower die part to grasp the bead part of the vulcanized tire by claws, carrying it to the carrying-out line.

(5) On the other hand, an unvulcanized tire is carried from the carrying-in line, held by the loader 7, and placed on the lower die part of the tire mold assembly 1 laid in open state.

(6) The lower central mechanism is operated to insert the bladder into the unvulcanized tire. Shaping is performed during the mold clamping step, and after the upper and lower die parts are closed, the tire mold assembly is pressurized to introduce the heating and pressurizing medium into the tire followed by sealing.

(7) When the upper and lower die parts are closed, the lower central mechanism and the upper movable plate are retreated downward and upward, respectively, in the state where the bladder is left in the mold.

(8) The tire mold assembly 1 is carried to the empty vulcanizing station C through the transfer station D.

The auxiliary station B comprises the same opening and closing device 6 as in the opening and closing station A which is attached to the mold base 2 as in the vulcanizing station C, so that the opening and closing of the mold base 2 can be performed in addition to vulcanization. Only the opening and closing device 6 may be provided so as not to perform the vulcanization. The auxiliary station B can be used as the mold replacing station as well as the use as the evacuation place when a trouble occurs in the opening and closing station A. In this case, a mold replacement/maintenance base 11 is attached to the side of the auxiliary station B.

In the trouble of the opening and closing station A, (1) the tire mold assembly 1 close to the vulcanization end is transferred from the transfer station D to the auxiliary station B.

(2) The upper die part of the tire mold assembly 1 is opened in the auxiliary station B to take out the vulcanized tire. Thereafter, the upper die part of the tire mold assembly 1 is closed, the tire mold assembly 1 is transferred to the vulcanizing station C through the transfer station D and heated so that the mold assembly 1 is not cooled, and the temperature is maintained and controlled.

(3) The above processes (1) and (2) are repeated until the opening and closing station A is restored, and returned to the general operation when the opening and closing station is restarted.

By providing the auxiliary station B, thus, the vulcanized tire can be taken out in the auxiliary station B without over-curing in the vulcanizing station C even if a trouble occurs in the opening and closing station A. Thus, no defective product by over-curing is provided.

In the mold replacement, the delivery of the tire mold assembly 1 having a mold replaced can be performed between the auxiliary station B and the vulcanizing station C during the general tire manufacturing process of delivering the tire mold assembly between the opening and closing station A and the vulcanizing station C. Therefore, time can be effectively utilized without requiring the interruption of vulcanization, and no effect is exerted on the production plan. In the mold replacement, the corresponding bladder may be, of course, replaced according to the mold (tire mold assembly 1).

As described above, the tire vulcanizing equipment of this embodiment comprises a vulcanizing station C having a plurality of circularly arranged mold bases 2 for placing the tire mold assembly 1 movable in closed state, which have pipings for supplying and discharging a vulcanizing/heating medium to the tire mold assemblies 1 placed thereon; an opening and closing station A having a mold base 2 arranged on the same circumference as the above circularly arranged mold bases, an opening and closing device 6 for opening and closing the tire mold assembly 1 placed on the mold base 2, an unloader (carrying-out device) 8 for carrying a vulcanized tire from the tire mold assembly 1, and a loader 7 (carrying-in device) for carrying a unvulcanized tire to the tire mold assembly 1, the opening and closing station being connected to a carrying-out line of vulcanized tire to the following step and a carrying-in line of unvulcanized tire; and a transfer station D arranged in the center of the same circumference to perform the transfer of the tire mold assembly 1 between the mold base 2 of the vulcanizing station C and the mold base 2 of the opening and closing station A which are arranged on the same circumference by the rotating action.

Figure 7:
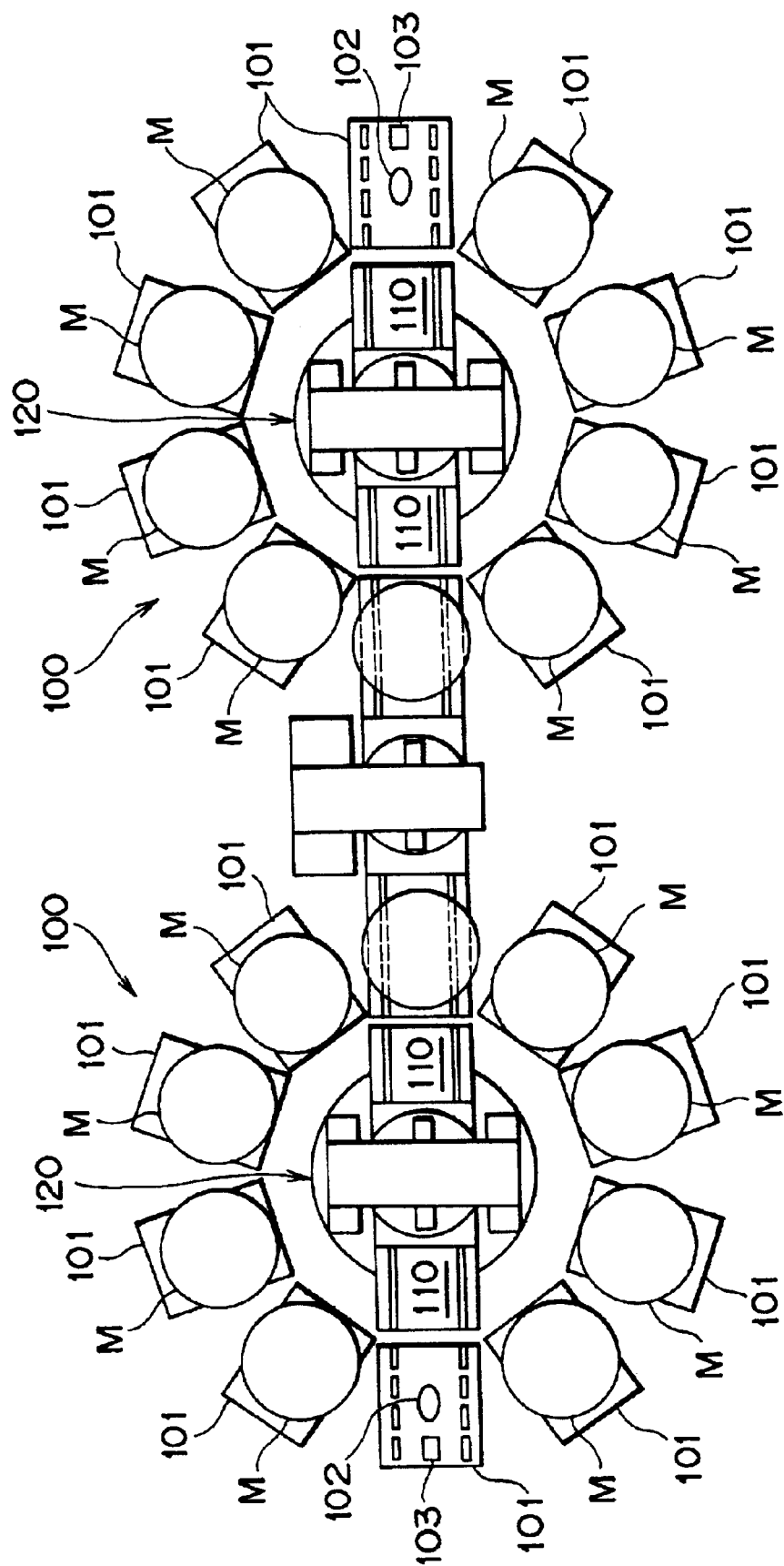
FIG. 7 is a plan arrangement view of a conventional tire vulcanizing equipment.
Figure 8:
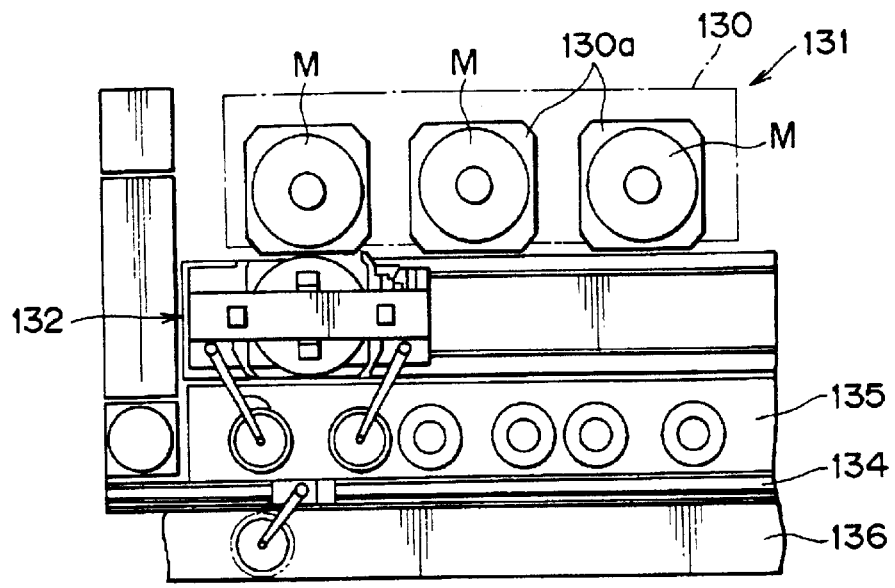
FIG. 8 is a plan arrangement view of another conventional tire vulcanizing equipment.
Figure 9:
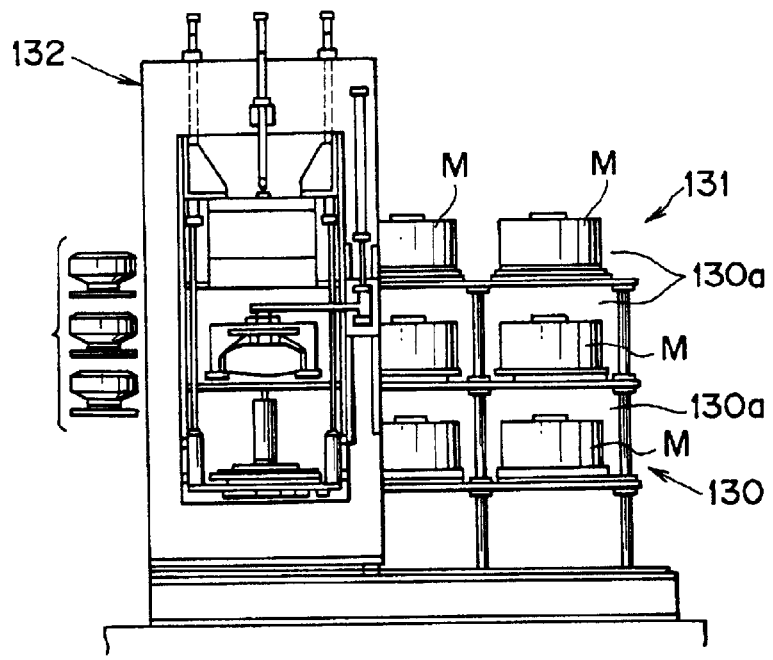
FIG. 9 is a front arrangement view of the above conventional tire vulcanizing equipment.

According to this constitution, the transfer station D has the function of transferring the tire mold assembly 1 between the vulcanizing station C and the opening and closing station A. On the other hand, the conventional opening and closing station A has the above-mentioned function, and the transfer is performed by moving the opening and closing station A itself to the vulcanizing station C (refer to FIG. 7). Therefore, since the transfer station D can be regarded as the same as a structure partially extracted from the conventional opening and closing station A, the weight can be significantly reduced, compared with the conventional opening and closing station A having all functions, and the height can be also reduced to lower the center of gravity.

Thus, the transfer station D can be constituted with a mechanism with small strength and driving force generation conformable to the reduction in weight, and the transfer station D can be consequently miniaturized and reduced in cost. Further, when the height of the transfer station D is reduced to lower the center of gravity, the danger of falling or vibration in rotating movement is reduced, so that the moving speed can be increased. Accordingly, the idle time up to the movement of the transfer station D to the intended tire mold assembly 1 and the carrying time from the loading of the tire assembly 1 to the carrying to the opening and closing station A can be shortened to realize a shorter cycle time of production.

Since the transfer of the tire mold assembly 1 between the opening and closing station A and the vulcanizing station C is performed by the rotating action of the transfer station D, the mold base 2 of the opening and closing station A can be fixed on the same circumference. Thus, the conventional distribution with a precondition of movement of the wiring and piping connected to each mechanism of the opening and closing station A is not required, and the opening and closing station A can be simplified. Further, since the number of wirings and pipings in the transfer station D can be suppressed to a one conformed to the minimum mechanism necessary for the transfer of the tire mold assembly 1, the complication accompanying the distribution of the wirings can be minimized. Consequently, the complication by the distribution of wirings can be sufficiently reduced as the whole tire vulcanizing equipment.

Further, since the carrying-out of vulcanized tires and carrying-in of unvulcanized tires are performed in one opening and closing station A, the physical distribution apparatuses of the carrying-out line and the carrying-in line can be simplified to realize the miniaturization of the whole equipment and the smoothness of the carrying-in and carrying-out operations to both the line.

The tire vulcanizing equipment in this embodiment further comprises the auxiliary station B having the mold base 2 arranged on the same circumference and the opening and closing device 6 for opening and closing the tire mold assembly 1 placed on the mold base 2, and the transfer station D is constituted so as to perform the transfer of the tire mold assembly 1 also between the mold base 2 of the auxiliary station B and the mold base 2 of the vulcanizing station C.

Accordingly, even if the opening and closing station A is stopped by any trouble, the taking-out of vulcanized tire can be performed in the auxiliary station B without stopping the flow of the whole equipment, and the products can be prevented from being defective or junk by over-curing.

The auxiliary station B can be used also as a mold replacing station by connecting a mold replacing line thereto. Since the transfer step of the tire mold assembly between the opening and closing station A and the vulcanizing station C or the vulcanizing step in the vulcanizing station can be continued during mold replacement in the mold replacing station, the mold replacing work can be efficiently performed without interrupting the tire manufacturing process.

The transfer station D in this embodiment comprises the mold transfer arm (delivering mechanism) for delivering the tire mold assembly 1 and the turntable 5 rotatable so as to set the guide direction of the tire mold assembly 1 by the mold transfer arm to the direction of an optional mold base 2 on the same circumference. Thus, the transfer station D can be realized with a simple structure, so that the number of parts and the assembling cost can be reduced, and high reliability with few failures can be realized. The rotating speed can be increased by lowering the center of gravity of the transfer station D. As the transfer station D, various known transfer methods such as by placing the tire mold assembly 1 on a moving truck can be adapted as well as by pushing and pulling the tire mold assembly 1 on the guide rails 3 by use of a different actuator such as mold transfer arm as in this embodiment.

Figure 4:
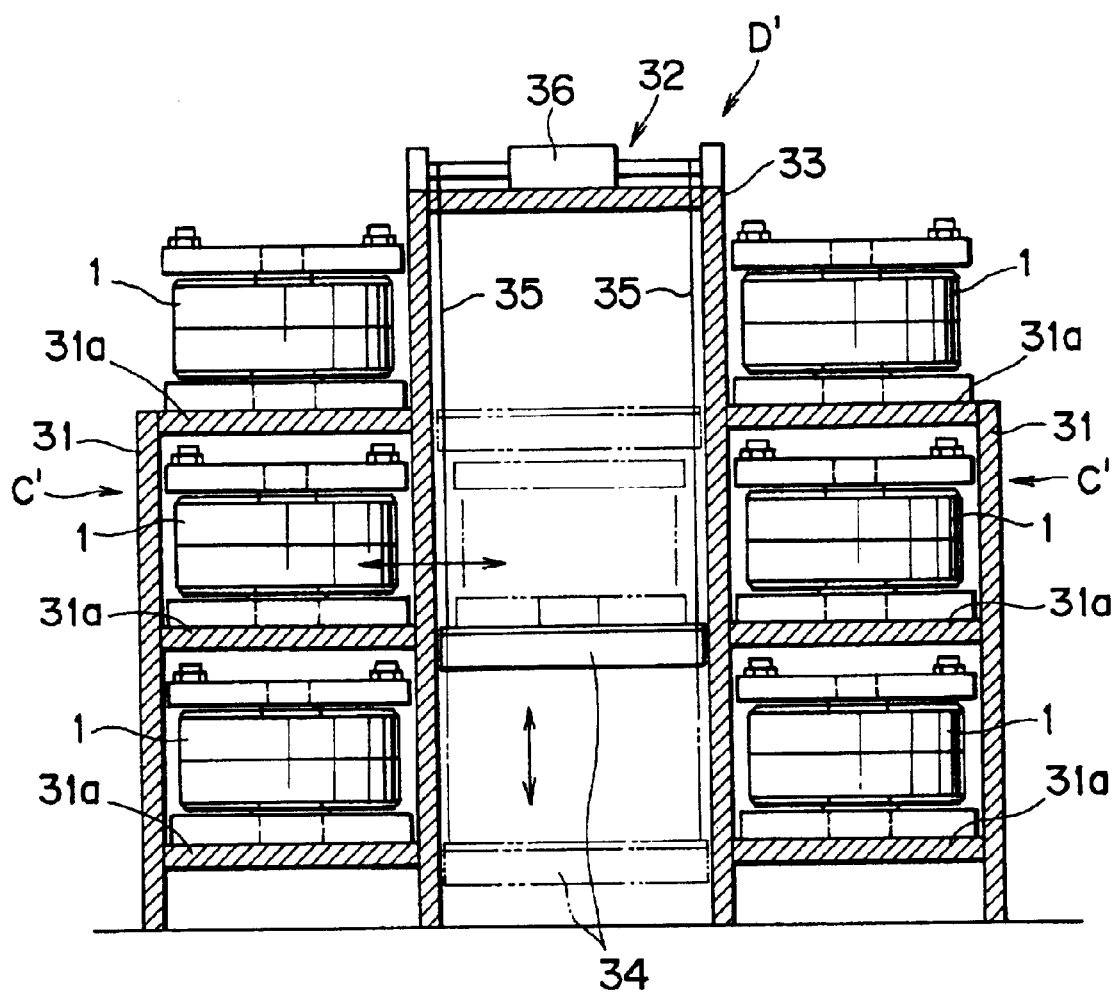
FIG. 4 is a perspective side view taken along the line X—X of the tire vulcanizing equipment in FIG. 3.

In this embodiment, the vulcanizing station C is constituted by circularly arranging a plurality of mold bases 2 for simplification, so that the delivery of the tire mold assembly 1 between the vulcanizing station C and the opening and closing station A can be performed by the rotating action of the transfer station D. However, actually, a housing shelf vertically having plural stages of placing parts is arranged as the mold base 2, as shown in FIG. 4 of a third embodiment of this invention described later, whereby the vulcanizing station C having a plurality of vertically arranged housing shelves is constituted, so that the delivery of the tire mold assembly 1 between an optional stage of the placing parts of each housing shelf and the opening and closing station A is performed by the rotating action and rising and falling action of the transfer station D. According to this, since the tire mold assembly 1 can be three-dimensionally housed followed by vulcanization while keeping the effect by the reduction in weight and simplification of the transfer station D, the building inner part can be more effectively utilized.

Figure 2:
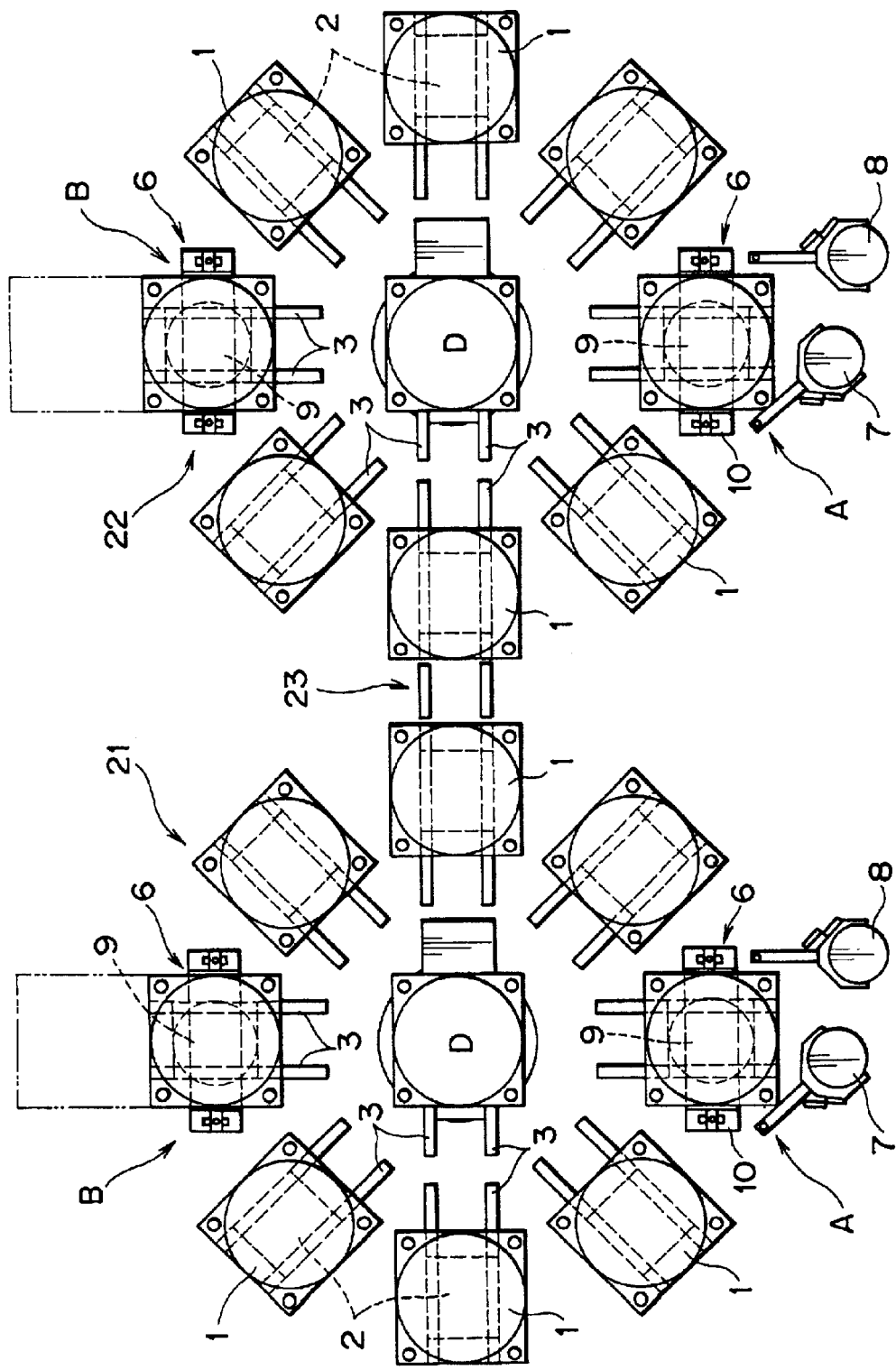
FIG. 2 is a plan arrangement view of a tire vulcanizing equipment according to a second embodiment of this invention.

A second embodiment of this invention is then described on the basis of FIG. 2. In the drawing, the same reference characters denote the same parts as in the above embodiment to omit the description therefor.

FIG. 2 is a plan arrangement view of the tire vulcanizing equipment according to the second embodiment of this invention. In the FIG. 2, the tire vulcanizing equipment comprises a line of two tire vulcanizing equipments 21, 22 of FIG. 1, in which the tire mold assembly 1 can be moved between both the equipments by laying guide rails 23.

Namely, this vulcanizing equipment comprises two circular station groups (an opening and closing station A, an auxiliary station B, a vulcanizing station C, and a transfer station D) arranged in a row, each station group having the circular arrangement of the stations A–C around the transfer station D, wherein these circular station groups are connected through the guide rails 23 allowing the movement of the tire mold assembly 1 between the both. The other components are the same as in the first embodiment. The station group means the structure containing the opening and closing station A, the vulcanizing station C and the transfer station D, and further the auxiliary station B as occasion demands. The tire vulcanizing equipment may comprise three or more station groups arranged in a row.

According to this, even if the opening and closing station A in one circular station group is stopped by any trouble, the taking-out of vulcanized tire can be performed without stopping the flow of the whole equipment since the tire mold assembly 1 can be carried to the other circular station group through the guide rails 23. Further, each of the opening and closing stations A of the circular station groups can be used also as the auxiliary station B of the other circular station group. Accordingly, even if the auxiliary station B is not provided on each station group, the tire mold assembly 1 can be carried to either one of the opening and closing stations A to avoid a trouble.

Figure 3:
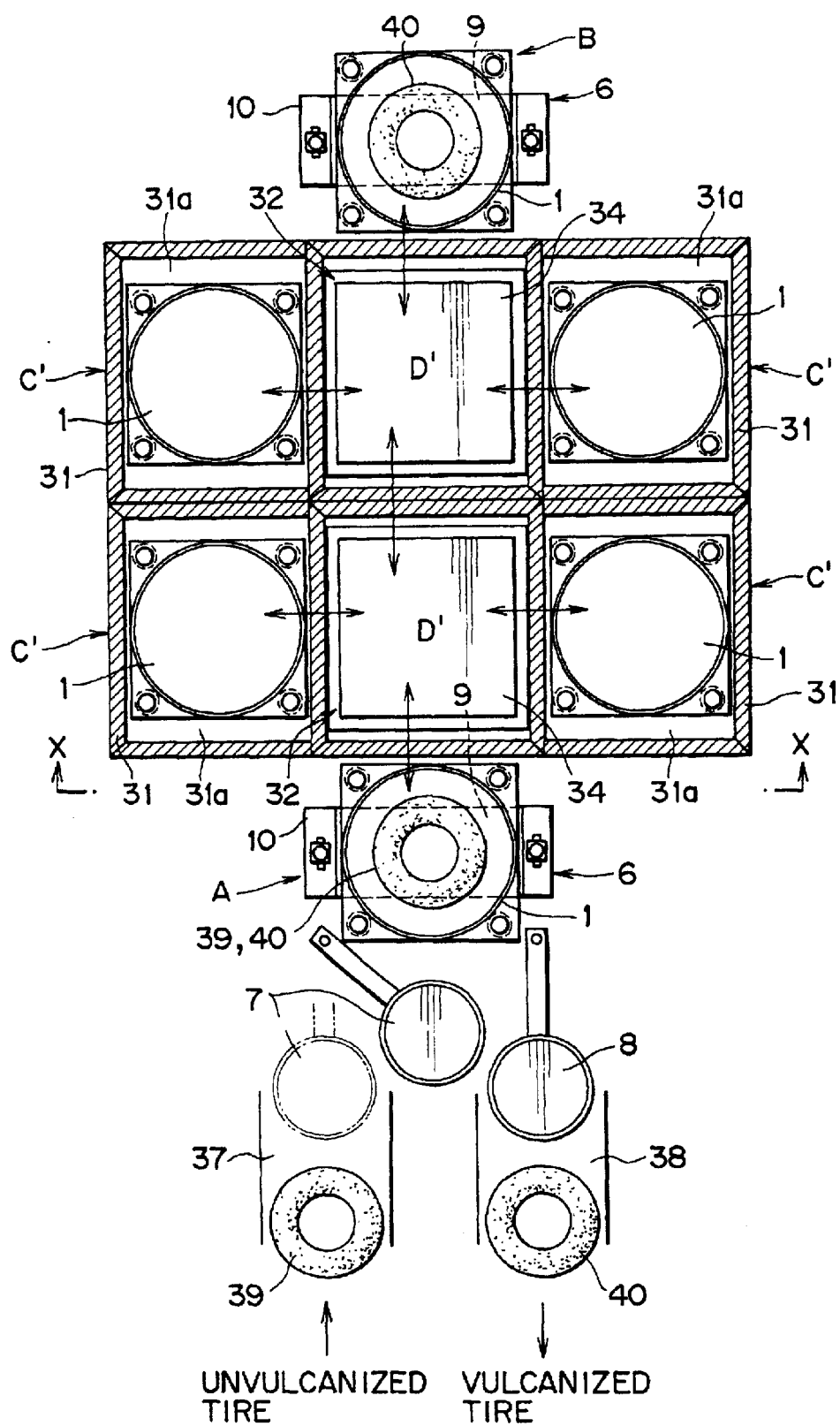
FIG. 3 is a plan arrangement view of a tire vulcanizing equipment according to a third embodiment of this invention.

A third embodiment of this invention is described on the basis of FIG. 3 and FIG. 4. In the drawings, the same reference characters denote the same parts as in the first embodiment to omit the description therefor.

The tire vulcanizing equipment of this embodiment comprises, as shown in FIG. 3, two transfer stations D' connected longitudinally (vertically in the drawing), an opening and closing station A and an auxiliary station B, which are arranged on one end side and the other end side in the connecting direction of the transfer stations D', respectively, and vulcanizing stations C' arranged symmetrically about each transfer station D'.

The vulcanizing station C' comprises a housing shelf 31 as shown in FIG. 4. The housing shelf 31 vertically has three stages of placing parts 31a for placing the tire mold assemblies 1 movable in closed state, which have pipings not shown for supplying and discharging a vulcanizing/heating medium to the tire mold assemblies 1 placed thereon.

The transfer stations D' are adjacent to the vulcanizing stations C' as described above. The transfer station D' has a rising and falling transfer device 32 for transferring the tire mold assembly 1 to an optional stage of the placing parts 31a of the housing shelf 31. The rising and falling transfer device 32 has a support frame 33 provided along the housing shelf 31, a rising and falling frame 34 for placing the tire mold assembly 1, which is provided within the support frame 33 in such a manner as to be capable of rising and falling, and a drive unit 36 provided on the upper surface of the support frame 33 to suspend the rising and falling frame 34 through chains 35 in such a manner as to be vertically movable. The rising and falling frame 34 has a first delivering mechanism. The first delivering mechanism can delivery the tire mold assembly 1 and switch the guide direction of the tire mold assembly 1 to the direction of an optional placing part of the adjacent stations A, B, C', and D' by allowing the switching of the guide direction to four longitudinal and lateral directions. As the first delivering mechanism, various known transfer methods such as by placing the tire mold assembly 1 on a moving truck can be adapted as well as by pushing and pulling the tire mold assembly 1 on the guide rails by use of a different actuator such as mold transfer arm as in the first embodiment. As the rising and falling transfer device 32, a lifter method for raising and lowering the rising and falling frame 34 by the vertical or cross combination of hydraulic cylinders can be adapted as well as the above-mentioned elevator method for raising and lowering the rising and falling frame 34 by the chains 35 and the driving unit 36.

The opening and closing station A or the auxiliary station B is adjacent to the transfer stations D' as shown in FIG. 3. Both the stations A, B are set in a height position corresponding to the bottom stage (first stage) of the housing shelf 31, and each station has a placing part consisting of a mold base not shown for placing the tire mold assembly 1 and an opening and closing device 6 for opening and closing the tire mold assembly 1 placed on the placing part. Further, the opening and closing station A has a loader 7 (carrying-in device) for carrying a unvulcanized tire 39 to the tire mold assembly 1, and an unloader 8 (carrying-out device) for carrying a vulcanized tire 40 from the tier mold assembly 1, and the opening and closing station A is connected to the carrying-in line 37 of the unvulcanized tire 39 and the carrying-out line 38 of the vulcanized tire 40 to the next step. The other components are the same as in the first embodiment.

The operation of the tire vulcanizing equipment in the above constitution is described. When the empty state of the tire mold assembly 1 opened by the opening and closing device 6 is confirmed in the opening and closing station A, as shown in FIG. 3, the loader 7 is rotated in the direction of the carrying-in line 37, and the unvulcanized tire 39 carried to the waiting position of the carrying-in line 37 is grasped by the loader 7. Thereafter, the unvulcanized tire 39 is carried and installed into the tire mold assembly 1 by the reverse rotation of the loader 7 while being grasped by the loader 7. The upper movable plate 9 of the opening and closing device 6 is lowered, whereby the tire mold assembly 1 is clamped in the state containing the unvulcanized tire 39.

While the installation and clamping of the unvulcanized tire 39 into the tire mold assembly 1 is performed as described above, the drive unit 36 of FIG. 4 is driven in the transfer station D' on the side closer to the opening and closing station A (lower side in the drawing) to lower the rising and falling frame 34 to the height position of the bottom stage, whereby the rising and falling frame 34 is set in the same height position as the mold base (placing part) not shown of the opening and closing device 6. When the clamping of the tire mold assembly 1 is ended, the first delivering mechanism provided on the rising and falling frame 34 pulls the tire mold assembly 1 in the opening and closing device 6 in the direction of the rising and falling frame 34 to move the tire mold assembly 1 onto the rising and falling frame 34 of the one-side transfer station D'.

The placing part 31a having no tire mold assembly 1 is then detected in each vulcanizing station C', and the vulcanizing station C' having the non-housing placing part 31a and the number of stages are specified. When the specified vulcanizing station C' is laterally adjacent to one transfer station D', the rising and falling frame 34 is raised and lowered so as to be set in the height position of the specified stage of the placing parts 31a, and the tire mold assembly 1 is pulled out from the rising and falling frame 34 by the first delivering mechanism not shown and transferred to this placing part 31a of the vulcanizing station C'. On the other hand, when the specified vulcanizing station C' is not laterally adjacent to the one transfer station D', the tire mold assembly 1 is transferred from the rising and falling frame 34 of the one transfer station D' to the rising and falling frame 34 of the other (upper in the drawing) transfer station D', and then transferred to the specified placing part 31a by the same operation as described above. The vulcanizing/heating medium is supplied to the tire mold assembly 1 placed on the placing part 31a to continuously perform the vulcanizing molding of the unvulcanized tire 39.

When the vulcanization draws to a close, the tire mold assembly 1 is transferred from the placing part 31a of the vulcanizing station C' to the rising and falling frame 34 of the transfer station D' by the operation reverse to the above, and then transferred from the rising and falling frame 34 of the transfer station D' to the mold base not shown of the operating and closing station A. Thereafter, the tire mold assembly 1 is opened by the opening and closing device 6 of the opening and closing station A, and the vulcanized tire 40 is taken out by the unloader 8 and transferred onto the carrying-out line 38. In the trouble of the opening and closing station A, the tire mold assembly 1 is transferred to the auxiliary station B through the other transfer station D' to take out the vulcanized tire 40. Since the operations of the opening and closing station A and the auxiliary station B are the same as in the first embodiment, the description is omitted.

As described above, the tire vulcanizing equipment of this embodiment comprises the vulcanizing stations C' having the housing shelves 31 vertically having three stages of placing parts 31a for placing the tire mold assemblies 1 movable in closed state, which have pipings for supplying and discharging the vulcanizing/heating medium to the tire mold assemblies 1 placed thereon; the opening and closing station A having the placing part consisting of the mold base not shown for placing the tire mold assembly 1, the opening and closing device 6 for opening and closing the tire mold assembly 1, the unloader 8 (carrying-out device) for carrying the vulcanized tire 40 from the tire mold assembly 1, and the loader 7 (carrying-in device) for carrying the unvulcanized tire 39 to the tire mold assembly 1, the opening and closing station A being connected to the carrying-out line 38 of the vulcanized tire 40 to the following step and the carrying-in line 37 of the unvulcanized tire 39; and the transfer station D' for performing the transfer of the tire mold assembly 1 between an optional stage of the placing parts 31a of the housing shelf 31 and the placing part of the opening and closing station A by the rising and falling action along the housing shelf 31 of the vulcanizing station C'.

In this embodiment, the number of stages of the placing parts 31a in the housing shelf 31 is set to 3, but any optional number of stages can be set without being limited by this. Further, although the vulcanizing stations C' are arranged symmetrically about the transfer stations D' in this embodiment, the vulcanizing stations C' may be arranged on either one lateral side of the transfer stations D', or arranged in three directions of the four directions around the transfer stations D'.

In this embodiment, the longitudinal arrangement of two transfer stations D' is adapted, but three or more transfer stations D' can be longitudinally and laterally connected according to the production capacity and equipment layout without being limited by this. In this case, also, the tire mold assembly 1 can be transferred to the opening and closing station A or the auxiliary station B while it is delivered between the adjacent transfer stations D', D'. The transfer station D' may be constituted longitudinally movably to adapt one transfer station.

According to the above, the weight of the transfer station D' can be reduced more significantly than in the conventional one for moving the opening and closing station similarly to the case of the first embodiment, and the transfer station D' can be miniaturized and reduced in cost. Since the number of the wirings or pipings in the transfer station D' can be suppressed to a one conformable to the minimum mechanism necessary for the transfer of the tire mold assembly 1, the complication accompanying the distribution of these wirings can be minimized. Since the opening and closing station A is fixable by the transfer station D', the complication accompanying the distribution of wirings in the opening and closing station A can be also minimized.

Further, since the transfer station D' performs the transfer by the rising and falling action, the danger of falling or vibration can be significantly reduced, compared with the transfer by moving forward or backward a heavy matter as in the past. Accordingly, the speed of the rising and filling action can be increased to shorten the idle time up to the movement of the transfer station D' to the intended tire mold assembly 1 and also the carrying time from the loading of the tire mold assembly 1 to the carrying to the opening and closing station A. A shorter cycle time of production can be consequently realized.

Figure 5:
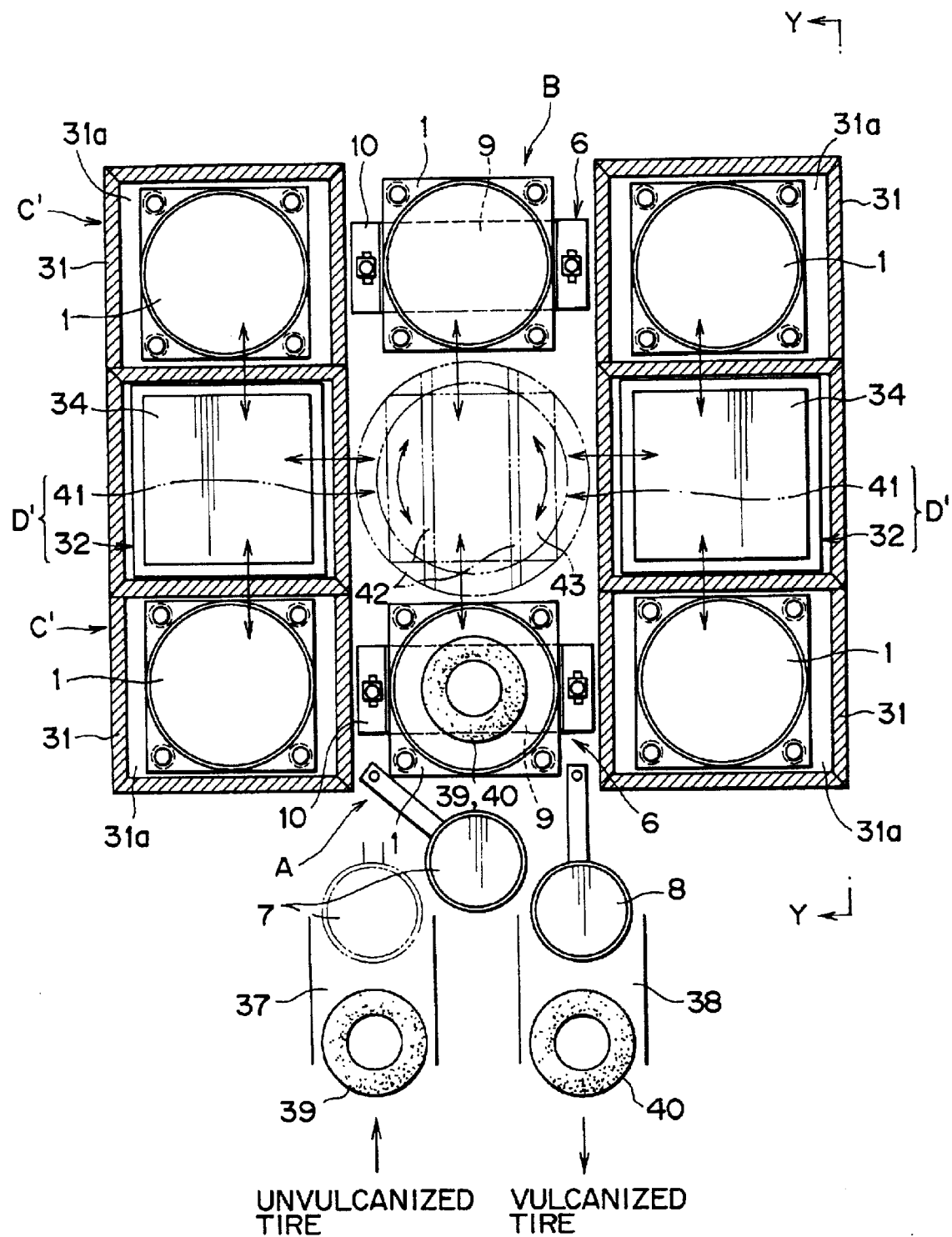
FIG. 5 is a plan arrangement view of a tire vulcanizing equipment according to a fourth embodiment of this invention.

A fourth embodiment of this invention is further described on the basis of FIGS. 5 and 6. In the drawings, the same reference characters denote the same parts as in the third embodiment to omit the description therefor.

The tire vulcanizing equipment of this embodiment comprises two transfer stations D' formed of a rising and falling transfer device 32 and a rotating transfer device 41 as shown in FIG. 5. Both the transfer stations D' commonly use one rotating transfer device 41 by arranging the rising and falling transfer devices 32 symmetrically about the rotating transfer device 41. Vulcanizing stations C' are arranged in the longitudinal direction of the rising and falling transfer device 32 of each transfer station D' as shown in FIG. 6, and an opening and closing station A and an auxiliary station B are arranged in the longitudinal direction of the rotating transfer device 41.

The rotating transfer device 41 has a second delivering mechanism having guide rails 42 for setting the guide direction of the tire mold assembly 1 and a mold transfer arm for pushing and pulling the tire mold assembly on the guide rails 42 to transfer it. As the second delivering mechanism, various known methods such as by placing the tire mold assembly 1 on a moving truck can be adapted.

The guide rails 42 are set in the height position corresponding to the bottom stage of the housing shelf 31 to function also as the placing part for placing the tire mold assembly 1. The guide rails 42 are provided on a turntable 43, and the turntable 43 is rotatable so as to set the guide direction to an optional placing part direction. The other components are the same as in the third embodiment.

The operation of the tire vulcanizing equipment in the above constitution is described. When the empty state of the tire mold assembly 1 opened by the opening and closing device 6 in the opening and closing station A is confirmed, a loader 7 is rotated in the direction of a carrying-in line 37, and a unvulcanized tire 39 carried to the waiting position of the carrying-in line 37 is grasped by the loader 7. Thereafter, the unvulcanized tire 39 is carried and installed into the tire mold assembly 1 by the reverse rotation of the loader 7 while being grasped by the loader 7. The upper movable plate 9 of the opening and closing device 6 is lowered, whereby the tire mold assembly 1 is clamped in the state containing the unvulcanized tire 39.

While the installation and clamping of the unvulcanized tire 39 in the tire mold assembly 1 is performed, the turntable 43 is rotated in the rotating transfer device 41 of the transfer stations D' to set the guide direction of the guide rails 42 to the direction of the opening and closing station A. The tire mold assembly 1 in the opening and closing device 6 is pulled in the direction of the guide rails 42 by the second delivering mechanism not shown, and the turntable 43 is rotated 90° to set the guide direction of the tire mold assembly 1 by the guide rails 42 to the direction of the rising and falling transfer device 32.

In the rising and falling transfer device 32, when the rising and falling frame 34 is lowered to the height position of the bottom stage and set to the same height position as the guide rails 42, the tire mold assembly 1 is pulled in the direction of the rising and falling frame 34 by a first delivering mechanism not shown provided on the rising and falling frame 34. Thereafter, the rising and falling frame 34 is raised and lowered to the height position of the stage of a non-housing placing part 31a as shown in FIG. 6, and the tire mold assembly 1 is pulled out from the rising and falling frame 34 by the first delivering mechanism and transferred to the placing part 31a of the vulcanizing station C'. The vulcanizing/heating medium is supplied to the tire mold assembly 1 transferred to the placing part 31a to vulcanization mold the unvulcanized tire 39.

When the vulcanization draws to a close, the tire mold assembly 1 is transferred from the placing part 31a of the vulcanizing station C' to the rising and falling transfer device 32 of the transfer station D' by the operation reverse to the above as shown in FIG. 5, and then transferred to a mold base not shown of the opening and closing station A through the rotating transfer device 41. Thereafter, the tire mold assembly 1 is opened by the opening and closing device 6 of the opening and closing station A, and a vulcanized tire 40 is taken out by an unloader 8 and transferred to a carrying-out line 38. In the trouble of the opening and closing station A, the tire mold assembly 1 is transferred to the auxiliary station B through the rotating transfer device 41 to take out the vulcanized tire 40. The operations of the opening and closing station A and the auxiliary station B are the same as in the first embodiment, and the description therefor is omitted.

Since the tire vulcanizing equipment of this embodiment has the effect equal to the constitution of the third embodiment, and the transfer station D' is formed of the rising and falling transfer device 32 and the rotating transfer device 41, the combination of the rising and falling transfer device 32 with the rotating transfer device 41 allows the more extension of the freedom in design of the equipment layout.

What is claimed is:

1. A tire vulcanizing equipment comprising:

a vulcanizing station having placing parts for placing tire mold assemblies movable in a closed state and a housing shelf vertically having plural stages of the placing parts;

an opening and closing station having a placing part for placing the tire mold assembly, an opening and closing device for opening and closing the tire mold assembly placed on the placing part of the opening and closing station, a carrying-out device for carrying a vulcanized tire from the tire mold assembly and a carrying-in device for carrying an unvulcanized tire to the tire mold assembly; and two transfer stations for transferring the tire mold assembly between a selected stage of the placing parts of the housing shelf and the placing part of the opening and closing station by a rotating action of the transfer stations and a rising and falling action of the transfer stations along the housing shelf of the vulcanizing station, said transfer stations comprising two independently vertically movable portions for simultaneously raising and lowering two tire mold assemblies; and means for transferring a tire mold assembly between said transfer stations.

2. A tire vulcanizing equipment comprising:
- a vulcanizing station having a housing shelf vertically having plural stages of placing parts for placing tire mold assemblies movable in closed state, which have pipings for supplying and discharging a vulcanizing/heating medium to the tire mold assemblies placed thereon;
- an opening and closing station having a placing part for placing a tire mold assembly, an opening and closing device for opening and closing the tire mold assembly placed on the placing part of the opening and closing station, a carrying-out device for carrying a vulcanized tire from the tire mold assembly and a carrying-in device for carrying a unvulcanized tire to the tire mold assembly, the opening and closing station being connected to a carrying-out line of vulcanized tires to a following step and a carrying-in line of unvulcanized tires; and
- two transfer stations for transferring the tire mold assembly between the placing part of a selected stage of the housing shelf and the placing part of the opening and closing station by a rotating action of the transfer stations and a rising and falling action of the transfer stations along the housing shelf of the vulcanizing station, said transfer station comprising two independently vertically movable portions for simultaneously raising and lowering two tire molds; and
- means for transferring a tire mold between said transfer stations.

3. A tire vulcanizing equipment according to claim 1, further comprising:
- an auxiliary station having a placing part for placing the tire mold assembly and an opening and closing device for opening and closing the tire mold assembly placed on the placing part of the auxiliary station.

4. A tire vulcanizing equipment according to claim 1, wherein
the opening and closing station is connected to a carrying-out line of vulcanized tires to a following step and a carrying-in line of unvulcanized tires.

5. A tire vulcanizing equipment according to claim 3, wherein
the auxiliary station has a carrying-out device for carrying vulcanized tires from the tire mold assembly and a carrying-in device for carrying unvulcanized tires to the tire mold assembly.

6. A tire vulcanizing equipment according to claim 3, wherein
the auxiliary station is connected to a carrying-out line of vulcanized tires to a following step and a carrying-in line of unvulcanized tires.

7. A tire vulcanizing equipment according to claim 3, wherein
a mold replacement/maintenance base is attached to the auxiliary station.

8. A tire vulcanizing equipment according to claim 1, wherein
the transfer station has a rising and falling transfer device comprising a first delivering mechanism capable of delivering the tire mold assembly and switching the guide direction of the tire mold assembly to a selected placing part direction, a placing part for placing the tire mold assembly received by the first delivering mechanism, and a lifting mechanism for raising and lowering the first delivering mechanism and the placing part of the rising and falling transfer device along the housing shelf.

9. A tire vulcanizing equipment according to claim 8, wherein
the transfer station has a rotating transfer device comprising a second delivering mechanism for delivering the tire mold assembly, a placing part for placing the tire mold assembly received by the second delivering mechanism, and a turntable rotatable so as to set the guide direction of the tire mole assembly by the second delivering mechanism to a desired placing part direction.

10. A tire vulcanizing equipment according to claim 8, wherein
a plurality of transfer stations is provided, so that the transfer of the tire mold assembly is performed between the respective transfer stations.

11. A tire vulcanizing equipment according to claim 1, wherein
the vulcanizing station has a plurality of circularly arranged placing parts, and the transfer station is arranged in the center o the same circumference as the circularly arranged placing parts, so that the transfer of the tire mold assembly between the circularly arranged placing part and the placing part of the opening and closing station is performed by the rotating action of the transfer station.

12. A tire vulcanizing equipment according to claim 11, wherein
an auxiliary station having a placing part for placing the tire mold assembly and an opening and closing device for opening and closing the tire mold assembly placed on the placing part is further provided on the same circumference, so that the transfer station performs the transfer of the tire mold assembly also between the placing part of the auxiliary station and the placing part of the vulcanizing station.

13. A tire vulcanizing equipment according to claim 11, wherein
two or more of said plurality of said circularly arranged placing parts are arranged in a row, and are mutually connected through guide rails allowing the movement of the tire mold assembly therebetween.

14. A tire vulcanizing equipment according to claim 11, wherein
the transfer station comprises a delivering mechanism for delivering the tire mold assembly and a turntable rotatable so as to set the guide direction of the tire mold assembly by the delivering mechanism to the direction of a selected circularly arranged placing part.

15. A tire vulcanizing equipment comprising:
- a vulcanizing station having a housing shelf having plural stages of placing parts for placing tire mold assemblies movable in a closed state, which have pipings for supplying and discharging a vulcanizing/heating medium to the tire mold assemblies placed thereon;
- an opening and closing station having a placing part for placing the tire mold assembly, an opening and closing device for opening and closing the tire mold assembly placed on the placing part of said opening and closing station, a carrying-out device for carrying a vulcanized fire from the tire mold assembly, and a carrying-in device for carrying a unvulcanized tire to the tire mold assembly, the opening and closing station being connected to a carrying-out line of vulcanized tires to a following step and a carrying-in line of unvulcanized tires; and two transfer stations for performing the transfer of the tire mold assembly between a selected stage of the placing parts of the housing shelf and the placing part of the opening and closing station by a rotating action of the transfer stations and a rising and falling action of the transfer stations along the housing shelf of the vulcanizing station, said transfer station comprising two independently vertically movable portions for simultaneously raising and lowering two tire molds; and means for transferring a tire mold between said two independently vertically movable portions.

16. A tire vulcanizing equipment comprising:

a vulcanizing station having placing parts for placing tire mold assemblies movable in a closed state and a housing shelf vertically having plural stages of the placing parts;

an opening and closing station having a placing part for placing the tire mold assembly, an opening and closing device for opening and closing the tire mold assembly placed on the placing part of the opening and closing station, a carrying-out device for carrying a vulcanized tire from the tire mold assembly and a carrying-in device for carrying an unvulcanized tire to the tire mold assembly; and two transfer stations for transferring the tire mold assembly between a selected stage of the placing parts of the housing shelf and the placing part of the opening and closing station by a rising and falling action of the transfer stations along the housing shelf of the vulcanizing station, said transfer station comprising two independently vertically movable portions for simultaneously raising and lowering two tire molds; and means for transferring a tire mold between said transfer stations.

17. A tire vulcanizing equipment comprising:

a vulcanizing station having a housing shelf vertically having plural stages of placing parts for placing tire mold assemblies movable in closed state, which have pipings for supplying and discharging a vulcanizing/heating medium to the tire mold assemblies placed thereon;

an opening and closing station having a placing part for placing a tire mold assembly, an opening and closing device for opening and closing the tire mold assembly placed on the placing part of the opening and closing station, a carrying-out device for carrying a vulcanized tire from the tire mold assembly and a carrying-in device for carrying a unvulcanized tire to the tire mold assembly, the opening and closing station being connected to a carrying-out line of vulcanized tires to a following step and a carrying-in line of unvulcanized tires; and two transfer stations for transferring the tire mold assembly between the placing part of a selected stage of the housing shelf and the placing part of the opening and closing station by a rising and falling action of the transfer stations along the housing shelf of the vulcanizing station, said transfer station comprising two independently vertically movable portions for simultaneously raising and lowering two tire molds; and means for transferring a tire mold between said transfer stations.

18. A tire vulcanizing equipment comprising:

a vulcanizing station having a housing shelf having plural stages of placing parts for placing tire mold assemblies movable in a closed state, which have pipings for supplying and discharging a vulcanizing/heating medium to the tire mold assemblies placed thereon;

an opening and closing station having a placing part for placing the tire mold assembly, an opening and closing device for opening and closing the tire mold assembly placed on the placing part of said opening and closing station, a carrying-out device for carrying a vulcanized tire from the tire mold assembly, and a carrying-in device for carrying a unvulcanized tire to the tire mold assembly, the opening and closing station being connected to a carrying line of vulcanized tires to a following step and a carrying-in line of unvulcanized tires; and two transfer stations for performing the transfer of the tire mold assembly between a selected stage of the placing parts of the housing shelf and the placing part of the opening and closing station by a rising and falling action of the transfer stations along the housing shelf of the vulcanizing station, said transfer station comprising two independently vertically movable portions for simultaneously raising and lowering two tire molds; and means for transferring a tire mold between said transfer stations.

* * * * *

UNITED STATES PATENT AND TRADEMARK OFFICE
CERTIFICATE OF CORRECTION

PATENT NO.   : 6,719,549 B1
DATED        : April 13, 2004
INVENTOR(S)  : Mitamura It is certified that error appears in the above-identified patent and that said Letters Patent is hereby corrected as shown below:

<u>Title page,</u>
Item [73], Assignee, should read:
-- [73]   Assignee: **Kabushiki Kaisha Kobe Seiko Sho
                    (Kobe Steel, Ltd.)**, Kobe (JP) --

Signed and Sealed this

Seventeenth Day of August, 2004

JON W. DUDAS
*Acting Director of the United States Patent and Trademark Office*